(No Model.)
W. R. WAGGONER.
ANCHOR FOR CHECK ROW WIRES.
No. 576,010. Patented Jan. 26, 1897.
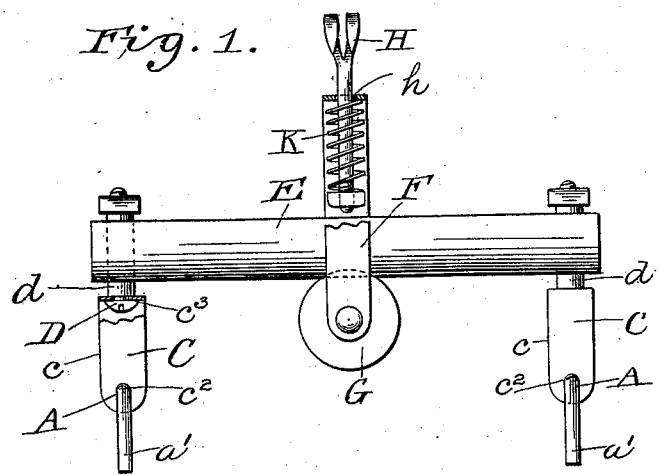
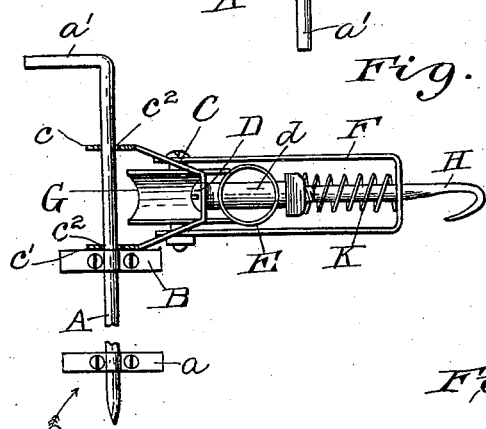
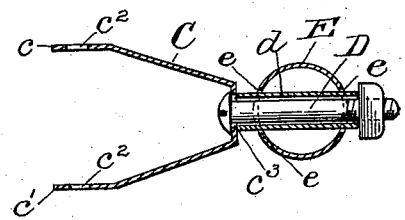
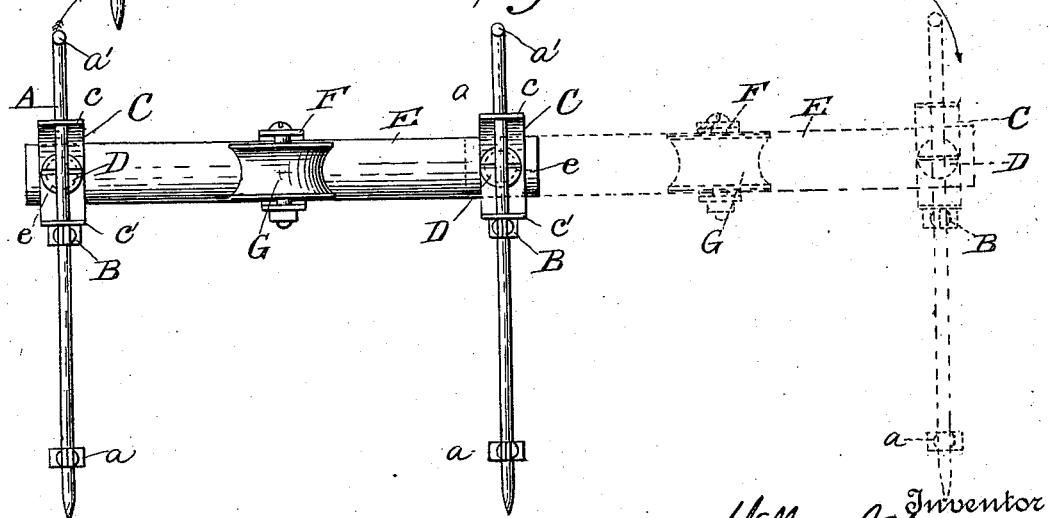
Witnesses
Jas H Blackwood
H P Doolittle
Inventor
William R Waggoner
by M Doolittle & Son
Attorney

UNITED STATES PATENT OFFICE.

WILLIAM R. WAGGONER, OF ART, INDIANA.

ANCHOR FOR CHECK-ROW WIRES.

SPECIFICATION forming part of Letters Patent No. 576,010, dated January 26, 1897.

Application filed May 18, 1896. Serial No. 592,078. (No model.)

*To all whom it may concern:*

Be it known that I, WILLIAM R. WAGGONER, a citizen of the United States, residing at Art, in the county of Clay and State of Indiana, have invented certain new and useful Improvements in Anchors for Check-Row Wires; and I do hereby declare the following to be a full, clear, and exact description of the invention, such as will enable others skilled in the art to which it appertains to make and use the same.

My invention relates to anchors for check-row wires, and has for its object to provide a simple, efficient, and inexpensive device for joining the wires used in connection with check-row planters and to render the same capable of easy adjustment and resetting and effective in keeping the wire taut throughout its length.

To these ends my invention consists of the parts and combinations of parts, as hereinafter described and claimed.

My invention is illustrated in the accompanying drawings, in which—

Figure 1 is a plan view of the anchor; Fig. 2, a side view; Fig. 3, a front view, and Fig. 4 a detail section through one end.

Referring to the drawings, A are the stakes, preferably made of iron, which support the anchor and are adapted to be driven into the ground, having their ends pointed for this purpose. To aid in pressing or driving the stakes or rods into the soil, foot-pieces $a$ are placed on the stakes and clamped thereto by screws passing through the parts embracing the stake. At its upper end the stake A terminates in a right-angled extension $a'$, which forms a grip or handle to enable a person to more readily pull the stake from the ground or to otherwise manipulate it. A movable clamping-support B is placed at any desired point on the stake and supports the lower arm of a stay or hanger C. The stay C is composed of two arms $c\ c'$, of which the lower $c'$, as before described, rests upon the support B. The stake passes through the holes $c^2$ in the ends of these arms and is free to turn therein. At its loop end, opposite to where the stake enters, the stay is provided with a hole $c^3$, through which passes a screw D, surrounded by a short section of tin pipe or other suitable casing $d$ held between the head of the screw and a nut on the end of the latter.

E is a cylindrical track-rod, preferably constructed of pipe in order to obtain both light weight and strength. At each end this rod is provided with holes $e$, through which passes so as to rotate freely therein the screw D with its casing $d$. A pivotal connection is thus formed between the rod E and the stays and stakes C and A, respectively.

Embracing the rod E is a clevis-shaped hanger or pulley-frame F, having at one end a pulley or roller G, rotatably mounted on a pin, rivet, or similar means joining the two arms of the pulley-frame. The pulley is adapted to be moved on and travel along the rod E. At the opposite end of the pulley-frame is a claw-hook H, passing through a hole $h$ in the frame, in which it turns freely. The portion of the hook within the frame for a short distance from its end is screw-threaded to receive a nut. Between this nut and the end of the pulley-frame and around the hook is placed a coiled spring K, the tension of which may be regulated by the pressure of said nut.

It will be seen that the principal parts of my device are all pivotally secured in and to their respective supports, whereby the anchor is rendered capable of adjustment in various ways to serve different and useful purposes, as hereinafter described.

In operation the stakes are first forced into the ground with the aid of pressure on the foot-pieces, and the latter then serve to key the stakes firmly in the ground and prevent tipping or canting to one side. The clamping-supports B are then adjusted to the required height and the knot or button on the end of the check-row wire engaged with the claw of the hook H. The coiled spring around the hook will exert sufficient tension upon the wire to prevent sagging, while at the same time yielding enough to obviate the danger of the anchor being pulled from its position by the strain upon it. Ordinarily in devices of this character, after one row and its return have been marked or planted, it is necessary to remove both stakes from the ground and replace them, but by my construction of the pivotal connections at $e$ only one stake need be pulled up at a time, and this is then swung up and over the other stake and reset in the ground. In such an arrangement it will be seen that the rows are certain to be kept in parallel lines, and uniformity near each end of the field is insured.

Having thus described my invention, what I claim is—

1. An anchor for check-row wires having two stakes, stays on said stakes, a hollow track-rod provided with an aperture near each end, a rod secured to said stays and adapted to enter said apertures and turn therein, thereby pivotally connecting said stays and track-rod, and means on said track-rod to engage the check-row wire, substantially as described.

2. An anchor for check-row wires composed of two stakes provided with means to aid in setting and releasing the same, adjustable stays on said stakes, a track-rod, pivotal connections for said rod and stays, a pulley on said rod and a spring-tension hook secured in the frame of said pulley, substantially as and for the purpose described.

3. In combination with the track-rod and its pivotal supports, a pulley adapted to travel on said rod, the pulley-frame embracing said rod, a claw-hook entering the inner end of said frame, a spiral spring surrounding said hook within said frame, and means on said hook to retain said spring and to regulate the tension thereof, substantially as described.

4. In an anchor for check-row wires, in combination with a track-rod and stakes, stays pivotally connected to said rod and having arms to engage said stakes, and a clamping-support on said stakes to adjust the height of said stays, substantially as described.

In testimony whereof I affix my signature in presence of two witnesses.

WILLIAM R. WAGGONER.

Witnesses:
CAMM. T. MORRIS,
BARNARD FOULKE.